F. W. PRINGLE.
CUCUMBER PICKER.
APPLICATION FILED JULY 12, 1920.
1,371,437.
Patented Mar. 15, 1921.
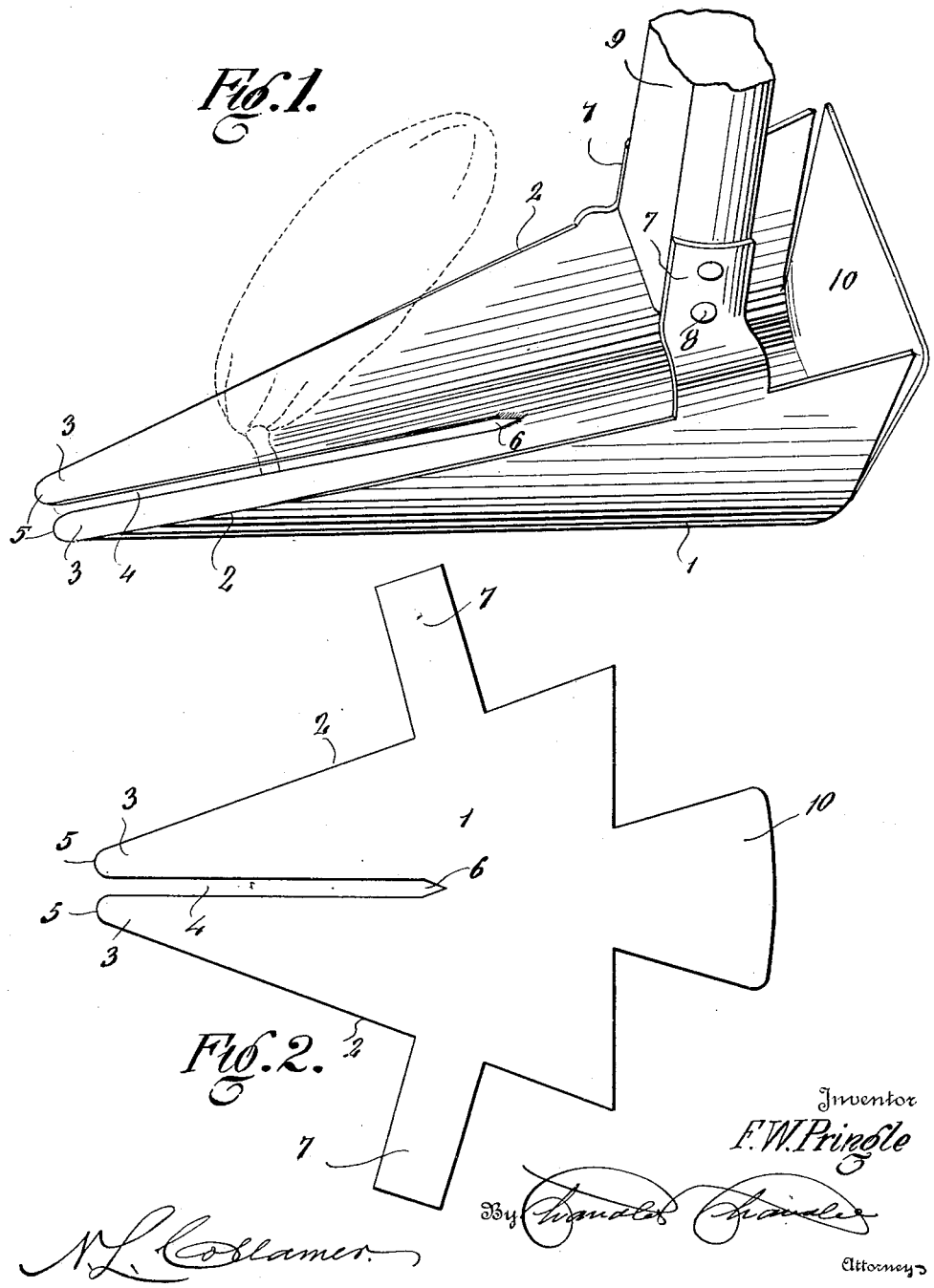

UNITED STATES PATENT OFFICE.

FRANK W. PRINGLE, OF CROSWELL, MICHIGAN.

CUCUMBER-PICKER.

1,371,437. Specification of Letters Patent. Patented Mar. 15, 1921.

Application filed July 12, 1920. Serial No. 395,542.

*To all whom it may concern:*

Be it known that I, FRANK W. PRINGLE, a citizen of the United States, residing at Croswell, in the county of Sanilac, State of Michigan, have invented certain new and useful Improvements in Cucumber-Pickers; and I do hereby declare the following to be a full, clear, and exact description of the invention, such as will enable others skilled in the art to which it appertains to make and use the same.

This invention relates to harvesters, and more especially to fruit gatherers; and the object of the same is to produce an implement more particularly designed for gathering cucumbers or similar articles which grow on the ground.

An object of the invention is to avoid the necessity on the part of the workman for stooping constantly or for working on the hands and knees, and this is accomplished by providing the tool-head with a long handle secured to it in such manner that the head can be manipulated by the operator when standing upright.

Another object of the invention is to avoid the unnecessary mutilation of the article gathered, and this is accomplished by disposing the stalk-cutter at the inner end of a deep fork.

Details of the preferred construction are set forth below and shown in the drawings wherein:

Figure 1 is a general perspective view of this tool or implement indicating in dotted outline a cucumber and its stalk astride which latter the fork is about to be passed.

Fig. 2 is is a plan view of the sheet metal blank from which the head of the tool is made.

Referring now particularly to the drawings, the head of this tool is by preference stamped in a single piece from sheet metal, being originally of the shape best seen in Fig. 2, and subsequently bent into the shape shown in Fig. 1. In its finished shape, this head comprises a transversely dished body 1 whose sides are cut off oblique on their upper edges 2 and continued forward in tapering fingers or prongs 3 spaced slightly to leave a slot 4 between them so that collectively they constitute a fork, and their front ends or tips 5 are rounded as seen. The contiguous edges of the fingers or prongs are spaced slightly and are dull for most of their length, and therefore the slot can be passed easily over the stem of a plant such as a cucumber. But the edges of this slot at its inner end converge in V-shape as shown at 6, and are sharpened so as to produce a cutter, and the sharpening can easily be done by means of a three-cornered file. The sides of the body are stamped with tangs as shown in Fig. 2, which, in the finished article, are carried upward and inward toward each other into ears 7, and between these ears at 8 is bolted, riveted, or otherwise fastened the lower end of a handle 9 which is preferably of wood and has sufficient length to permit the operator to stand upright when using the tool. Fig. 1 shows this handle disposed on a line substantially at right angles to the axis of the body 1. This is my intention and my preference but I do not wish to be limited to such angle as it may be possible the operator prefers to set the handle a little out of perpendicular, and therefore it may be necessary for descriptive purposes to say that the handle stands substantially at right angles to the metallic head. Also it may be that the operator will prefer to substitute for a straight handle, one which is bent or which may be provided with a handhold. In stamping out the blank, a wing 10 is formed which in the finished article is bent upwardly against or nearly against the rear ends of the sides of the body so that the latter is practically closed.

In use, the device is carried to the point where the cucumbers are to be gathered, and the operator while standing erect may use the head to brush aside leaves or turn over the vines so as to expose the cucumbers which have ripened to a point where they need to be picked. Passing the tips 5 astride the stem, he moves the head so that the stem travels along the slot 4 and the cucumber follows it into the body 1; and when the cutting edges at 6 strike the stem, the latter is cut off quickly and the vegetable left in the body, resting against the rear end 10. The operator now raises the device and either picks the vegetable out of the head, or turns the head over and dumps the vegetable into a basket or bag which may be slung over his shoulder. Thus it has not been necessary for him to stoop, and as a result his labor is lightened as will be clear.

While I have described this device as intended for picking articles such as cucumbers, it is clear that by making it in the proper size and shape it might be used for picking larger articles such as cantaloupes. Also it might be possible to make it smaller so as to pick smaller articles, but in any case and in any use I would maintain the essential features which are that the walls of the slot are dull except at the extreme inner end so that the stem is not severed until the fruit or vegetable is well housed within the body, and also that the handle has proper length and shape to permit the operator to work while standing upright.

What is claim is:

The herein described cucumber picker, the same comprising a head of sheet metal transversely dished to form a channeled body having a slot along its bottom from its front end inward, the edges of the slot being sharpened at its rear end, the rear end of the body being turned upward, ears rising from the sides of the body, and a handle substantially perpendicular to the length of the body and having its lower end secured between said ears.

In testimony whereof I affix my signature in the presence of two witnesses.

FRANK W. PRINGLE.

Witnesses:
J. I. GALBRAITH,
CHARLES WASP.